(12) United States Patent
Steinmaier

(10) Patent No.: US 6,264,164 B1
(45) Date of Patent: Jul. 24, 2001

(54) SUSPENSION LUG FOR A SWINGING LOAD

(75) Inventor: Klaus Steinmaier, Waldkraiburg (DE)

(73) Assignee: SGF Süddeutsche Gelenkscheibenfabrik GmbH & Co. KG (DE)

( * ) Notice: Subject to any disclaimer, the term of this patent is extended or adjusted under 35 U.S.C. 154(b) by 0 days.

(21) Appl. No.: 09/664,927

(22) Filed: Sep. 19, 2000

Related U.S. Application Data

(63) Continuation of application No. PCT/EP99/01772, filed on Mar. 17, 1999.

(30) Foreign Application Priority Data

Mar. 20, 1998 (DE) .............................................. 198 12 347

(51) Int. Cl.⁷ .................................................... F16M 1/00
(52) U.S. Cl. .......................................... 248/610; 248/632
(58) Field of Search ..................... 248/610, 634, 248/632, 636, 638, 644, 60; 267/152, 153; 180/309

(56) References Cited

U.S. PATENT DOCUMENTS

| | | | |
|---|---|---|---|
| 4,893,778 | * 1/1990 | Dräbing et al. | 248/610 |
| 5,032,342 | 7/1991 | Dräbing et al. | 264/263 |
| 5,271,595 | * 12/1993 | Simon et al. | 248/632 |
| 5,934,653 | * 8/1999 | Rivin | 267/152 |

FOREIGN PATENT DOCUMENTS

| | | | |
|---|---|---|---|
| 4036002A1 | * 6/1978 | (DE) . | |
| 2658358 | 6/1978 | (DE) . | |
| 3737987 | 5/1989 | (DE) . | |
| 4139381 | 4/1993 | (DE) . | |
| 0710769 | 5/1996 | (EP) . | |

* cited by examiner

*Primary Examiner*—Anita M. King
*Assistant Examiner*—Holly N. Sy
(74) *Attorney, Agent, or Firm*—Webb Ziesenheim Logsdon Orkin & Hanson, P.C.

(57) ABSTRACT

A ring-shaped elastomer body is defined by an outer wall and an inner wall and includes two diametrically opposed suspension poles and two equatorial zones. The suspension poles and the equatorial zones are arranged such that the suspension poles move away from each other and the equatorial zones approach each other when the suspension lug is subjected to tensile loading. A flexible insert is embedded in the elastomer body such that the insert transmits tensile forces from one of the suspension poles to the other of the suspension poles through the equatorial zones when the suspension lug is subjected to tensile loading. The distance of the insert from the inner wall of the elastomer body decreases steadily from the suspension poles to the equatorial zones. As a result, no harmful tensile stress can occur anywhere in the elastomer body when the suspension lug is subjected to tensile loading.

20 Claims, 5 Drawing Sheets

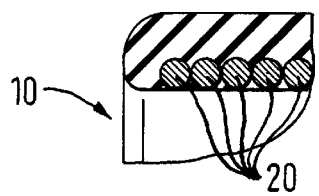
FIG. 3A
FIG. 1
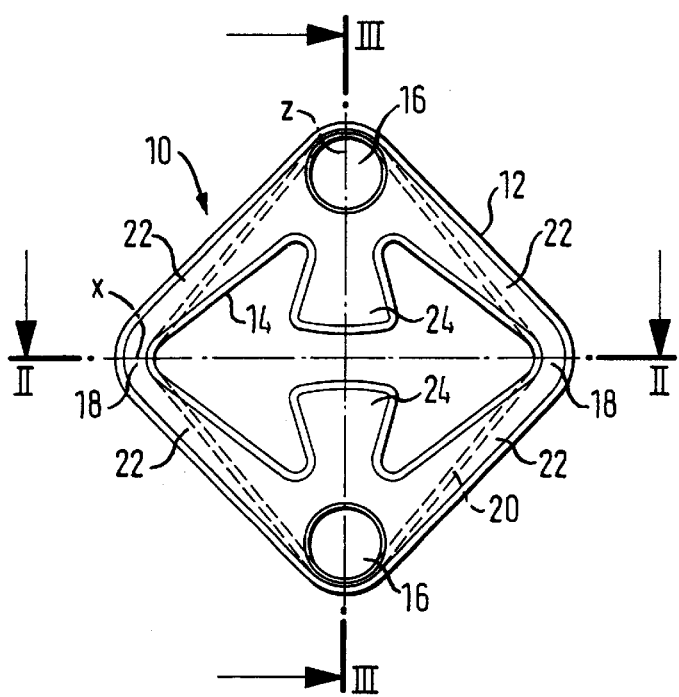
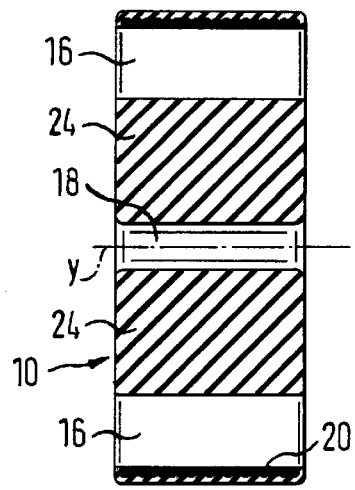
FIG. 3
FIG. 2
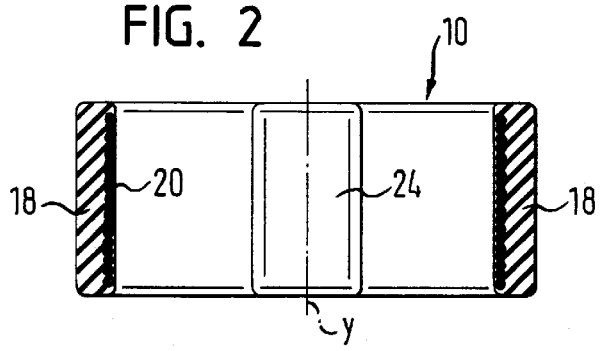
FIG. 2A
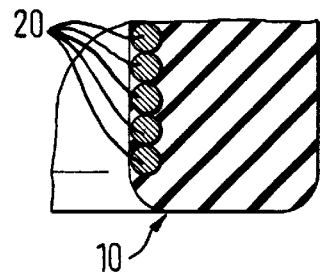

SUSPENSION LUG FOR A SWINGING LOAD

CROSS-REFERENCE TO RELATED APPLICATIONS

This application is a continuation of International Patent Application Number PCT/EP99/01772, filed on Mar. 17, 1999, and designating inter alia, the United States, which claims priority to German Application No. 198 12 347.7, filed Mar. 20, 1998.

BACKGROUND OF THE INVENTION

1. Field of the Invention

The invention relates to a suspension lug for a swinging load and, in particular, for an exhaust system of a motor vehicle.

2. Description of the Prior Art

In a known suspension lug disclosed in German Reference No. DE 37 37 987 C2 an elastomer body of the suspension lug has a diamond-shaped outer wall, as seen from the front, and a flexible insert, which is of corresponding diamond shape so that its distance from the outer wall of the elastomer body is substantially the same everywhere. In an area of two suspension poles and in the two equatorial zones of the suspension lug the distance of the inner wall of the elastomer body from the insert is particularly great. The minimum distance between the inner wall and the insert exists approximately in the middle between each of the suspension poles and the two equatorial zones. When this known suspension lug is subjected to tensile loading as envisaged, in other words when the two suspension poles move away from each other, tensile stress results in the elastomer body outside of the insert in the area of the two suspension poles, whereas compressive stress is caused in the two equatorial zones. Within the insert, compressive stress is caused in the areas of the two suspension poles, whereas tensile stress results in the equatorial zones. The flexible insert is made of an elastically extensible material so that the excursions of the insert and the elastomer body are of a similar order of magnitude. That is intended to give the known suspension lug a characteristic which is especially well adapted to small deflections on one hand, and to great deflections, on the other hand. However, the proportion of the overall tensile loading which must be transmitted by tensile stress in the two equatorial zones of the elastomer body is so considerable that a suspension lug of a given size can be expected to withstand only relatively little tensile loading in continuous operation.

Another known suspension lug is discloses by German Reference No. DE 26 58 358 B2 and possesses an insert made of spring steel strip which is practically inextensible. Its distance is substantially constant both from the outer wall of the elastomer body, an outer wall which likewise is diamond-shaped with this suspension lug, and from a plurality of recesses which are left free within the area of the elastomer body as defined by the insert.

It proved that the service life of these known suspension lugs is not always satisfactory. It is, therefore, the object of the invention to improve a suspension lug of the kind specified initially, especially as regards its service life.

SUMMARY OF THE INVENTION

The object is met, according to the invention, in that the distance of the insert from the inner wall of the elastomer body decreases steadily from the suspension poles to the equatorial zones.

According to the invention there is only so much elastomer in the equatorial zones within the area delimited by the flexible insert as is required to protect the insert. Consequently, the tensile stress occurring in the equatorial zones of the elastomer body is negligibly small when the suspension lug is subjected to tensile loading. In the area of the suspension poles of the suspension lug according to the invention, however, the distance of the flexible insert from the outer wall is relatively small. Here, the thickness of the elastomer body, as measured from the insert to the outside, preferably is only just great enough to protect the insert. As a result of the steadily decreasing distance of the insert from the inner wall of the elastomer body, starting from the suspension poles towards the equatorial zones, in accordance with the invention, no harmful tensile stress occurs anywhere in the elastomer body when the suspension lug is subjected to tensile loading. Thus the elastomer body essentially is loaded by pressure and, in specific areas, by thrust. As is well known, elastomer bodies are much less sensitive to compressive and shearing stress than to tensile stress, also, and particularly so, when in continuous service. As a result, a suspension lug according to the invention which is intended to be loaded by certain tensile forces can be made with less expenditure in elastomer and, therefore, at lower cost and much smaller in size than known suspension lugs of the generic type in question, without any loss in useful life. Suspension lugs according to the invention settle less in the course of their life span and have a more constant force-path characteristic than known suspension lugs of the kind specified. Because of the low tensile stress, elastomers having little resistance to tearing and tear propagation, such as silicone rubbers can be used for suspension lugs according to the invention. As these materials are high temperature resistant they are suitable for suspension lugs which are loaded with tensile forces at high ambient temperature.

In a preferred embodiment of the suspension lug according to the invention the flexible insert is substantially non-extensible,—in contrast to the suspension lug known from German Reference No. DE 37 37 987 C2, but in agreement with the suspension lug known from German Reference No. DE 26 58 358 B2. The insert thus has a much higher modulus of elasticity than the elastomer body.

Embodiments of the invention will be described in greater detail below with reference to diagrammatic

BRIEF DESCRIPTION OF THE DRAWINGS

FIG. 1 shows a first suspension lug according to the invention unloaded, as seen from the side;

FIG. 2 is the horizontal section II—II of FIG. 1;

FIG. 2A is a greatly enlarged cutout of FIG. 2;

FIG. 3 is the vertical section III—III of FIG. 1;

FIG. 3A is a greatly enlarged cutout of FIG. 3;

DETAILED DESCRIPTION OF THE PREFERRED EMBODIMENTS

Figure 4:
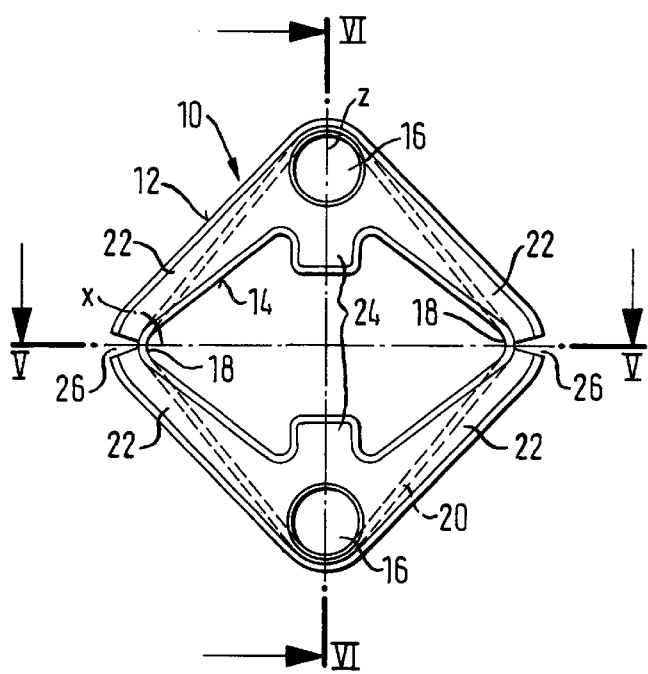
FIG. 4 shows a second suspension lug according to the invention, unloaded, as seen from the side.

The suspension lug illustrated in FIGS. 1 to 3A comprises an elastomer body 10 having an outer wall 12. As shown in the side elevation of FIG. 1, this wall is shaped like a square with rounded corners when the suspension lug is unloaded. The elastomer body further has an inner wall 14 delimiting a uniform recess which is shaped like a horizontal double arrow, as may be seen in FIG. 1. According to FIGS. 2 and 3 the elastomer body 10 has a thickness which corresponds approximately to half of its lateral length. The elastomer body 10 includes suspension poles 16 each in the area of its upper and lower corners. In all the embodiments shown, each suspension pole is formed by a cylindrical hole into which a corresponding pin can be introduced. For example, a pin fastened to the bottom plate of a motor vehicle may be inserted in the upper suspension pole, and a pin fastened to the exhaust muffler may be inserted in the lower suspension pole. It is likewise possible to have both suspension poles 16 lined with a sleeve made of steel or heat insulating, hard material embedded in the elastomer body 10, especially by vulcanization.

The elastomer body 10 is symmetrical with respect to a horizontal X-Y plane as well as a vertical Y-Z plane. In the X-Y plane the elastomer body 10 has two equatorial zones 18 which are disposed diametrically opposite each other at approximately the same distance as the two suspension poles 16.

An insert 20 which is flexible but not substantially extensible is embedded in the elastomer body 10 and extends around the two suspension poles 16 and through the equatorial zones 18. In the embodiment shown, the insert is embodied by a coiled thread or wire which is evenly distributed over almost the entire width of the elastomer body, as measured in Y-direction. The insert 20 also may be made of flat material, such as bands, foils, or fabrics. Furthermore, the insert 20 may comprise a thread or, preferably, a plurality of intersecting threads which extend diagonally between the suspension poles 16.

In the range of the suspension poles 16, the insert 20 is located at minimum distance from the outer wall 12 of the elastomer body 10. This distance is selected such that the insert will just be covered in order to be sufficiently protected. If the insert 20 is made of a material which is not sensitive to environmental influences the insert may be exposed in the area above the top suspension pole 16 and below the bottom suspension pole 16. From the suspension poles 16 towards the equatorial zones 18 the distance of the insert 20 from the outer wall 12 of the elastomer body 10 increases steadily and, at the same time, its distance from the inner wall 14 decreases steadily. In the equatorial zones 18, the insert 20 comes so close to the inner wall 14 of the elastomer body 10 that it is just covered sufficiently by elastomer material to be protected. It may be exposed, provided it is made of a material not affected by influences of the environment.

Together, the elastomer body 10 and the insert 20 form a transverse beam 22 between each of the two suspension poles 16 and each of the equatorial zones 18. Each one of this total of four transverse beams 22 tapers in the direction from the suspension pole 16 from which it starts to the equatorial plane 18 at which it ends. The insert 20 is arranged in such manner in each of these transverse beams that it defines a neutral axis as regards bending.

In the case of the suspension lug illustrated in FIGS. 1 to 3A a buffer 24 is disposed between two each of the diverging transverse beams 22 which start from a common suspension pole 16, the buffer reaching up to the vicinity of the X-Y plane. When the suspension lug is loaded by tension, in other words when the two suspension poles 16 are pulled away from each other, bending moments occur in the four transverse beams 22 but they do not lead to any tensile stress substantially anywhere in the elastomer body 10, due to the arrangement described of the insert 20. If, however, the two suspension poles 16 are moved towards each other over more than a certain minor distance, e.g. during swinging motions of an exhaust system suspended from the body of a motor vehicle by the suspension lug, then the two buffers 24 hit each other, thereby preventing deformation of the suspension lug. Such deformation otherwise would lead to considerable tensile stress in the elastomer body 10 in both equatorial zones 18 outside of the insert 20.

Figure 6:
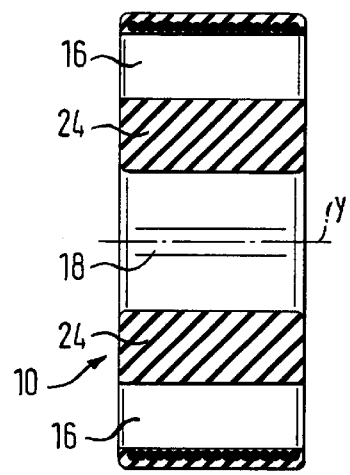
FIG. 6 is the vertical section VI—VI of FIG. 4.
Figure 5:
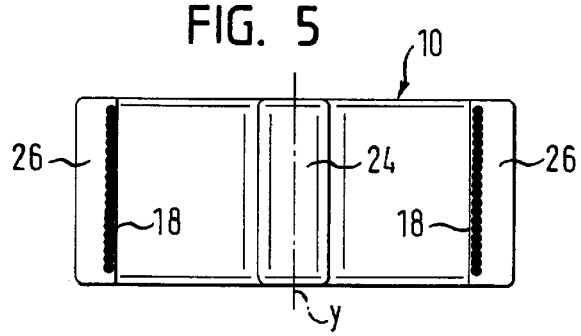
FIG. 5 is the horizontal section V—V of FIG. 4.

The suspension lug according to FIGS. 4 to 6 differs from the one illustrated in FIGS. 1 to 3A in that the two buffers 24 are shorter so that, in the unloaded state of the suspension lug, they terminate at a greater spacing from the X-Y plane. As a result, the suspension lug according to FIGS. 4 to 6 can be compressed more than the one shown in FIGS. 1 to 3A. However, in order to prevent tensile stress from occurring in the elastomer body 10 in the equatorial zones 18 outside of the insert 20 when the suspension lug is compressed to become flat in shape, the elastomer body comprises a notch 26 each in the equatorial zones 18. At the outside, the notches extend almost up to the insert 20 or all the way up to the insert 20 if the latter is insensitive to environmental influences.

Figure 7:
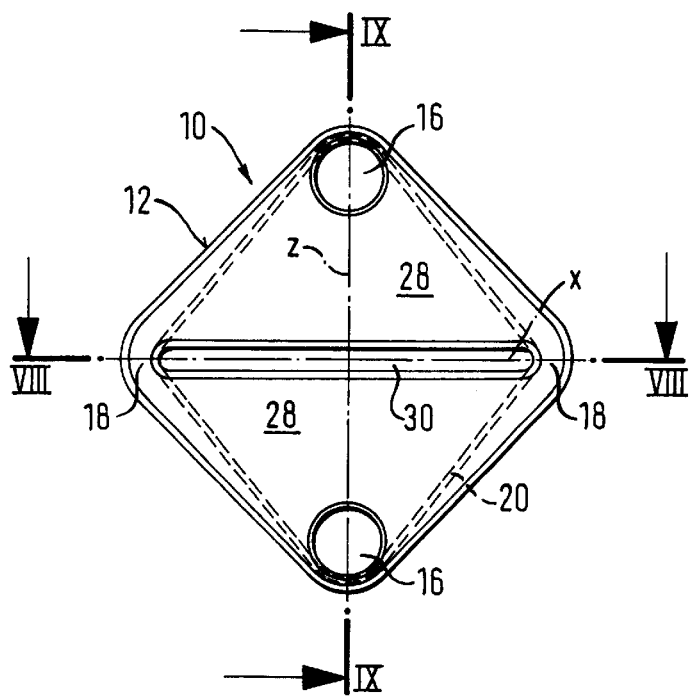
FIG. 7 shows a third suspension lug according to the invention, unloaded, as seen from the side.
Figure 9:
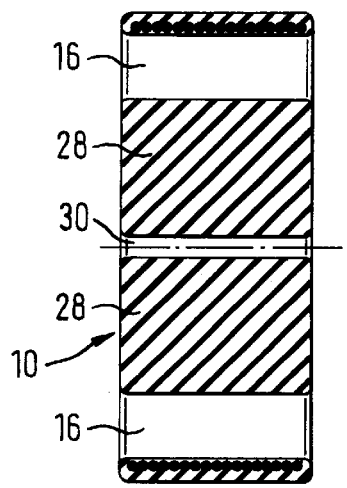
FIG. 9 is the vertical section IX—IX of FIG. 7.
Figure 8:
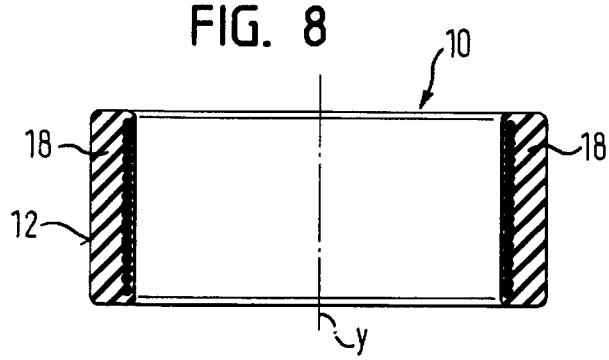
FIG. 8 is the horizontal section VIII—VIII of FIG. 7.
Figure 10:
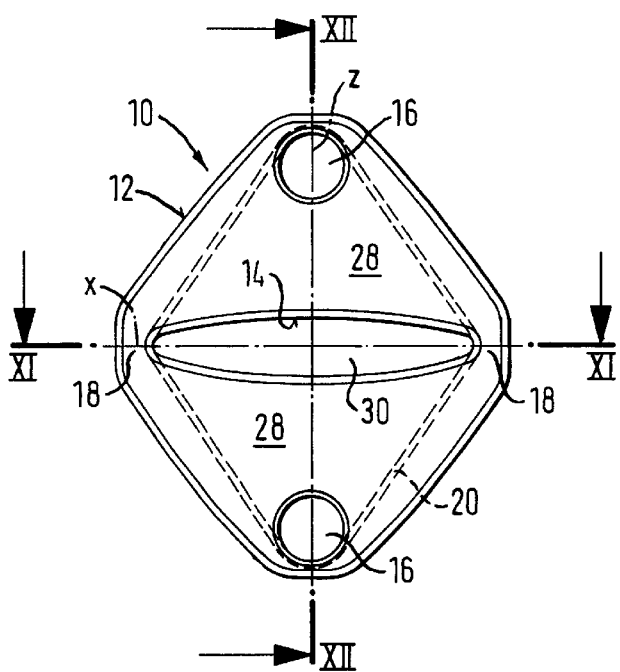
FIG. 10 shows suspension lug of FIG. 7, as seen from the side, but in loaded condition.
Figure 12:
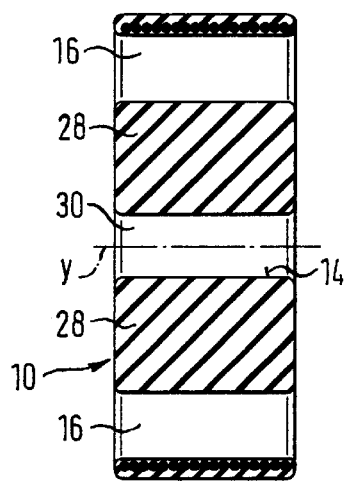
FIG. 12 is the vertical section XII—XII of FIG. 10.
Figure 11:
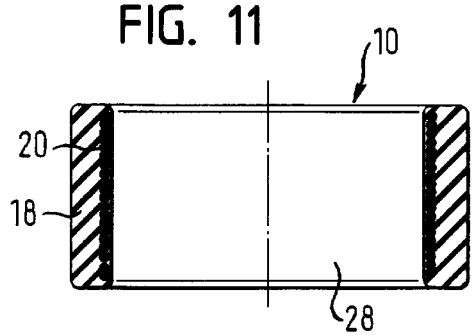
FIG. 11 is the horizontal section XI—XI of FIG. 10.

In the suspension lug illustrated in unloaded condition in FIGS. 7 to 9 and loaded by tension in FIGS. 10 to 12, the transverse beams 22 and buffers 24 are replaced by a pair of pressure pads 28 between which only an equatorial slot 30 is left free. This slot 30 extends from one equatorial zone 18 to the other so that there the insert 20 is at least almost exposed. In the two equatorial zones 18, the elastomer body 10 has a thickness worth mentioning only outside of the insert 20, as in FIG. 1. In unloaded condition, the equatorial slot 30 according to FIGS. 7 and 9 has approximately unvarying narrowness over its entire length. The slot 30 widens, as illustrated in FIGS. 10 and 12, when the suspension lug is subjected to tensile loading. Then the two pressure pads 28 are loaded essentially by pressure and additionally by shearing force. Again no tensile stress substantially occurs. If, on the other hand, the suspension lug is loaded by pressure tending to move the two suspension poles 16 towards each other, then the equatorial slot 30 will close. The two pressure pads 28 thus substantially prevent tensile stress from occurring in the equatorial zones 18 outside of the insert 20.

Figure 13:
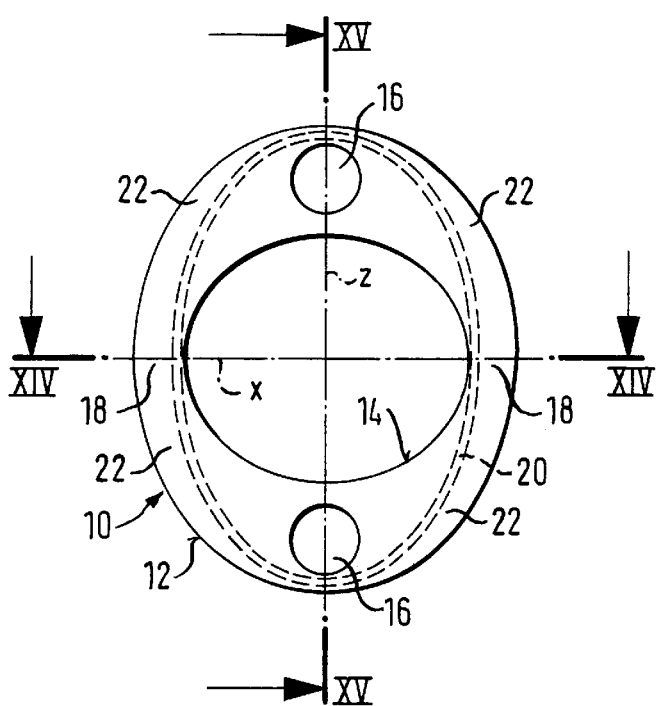
FIG. 13 shows a fourth suspension lug according to the invention, unloaded, as seen from the side.
Figure 15A:
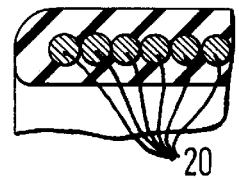
FIG. 15A is a greatly enlarged cutout of FIG. 15.
Figure 15:
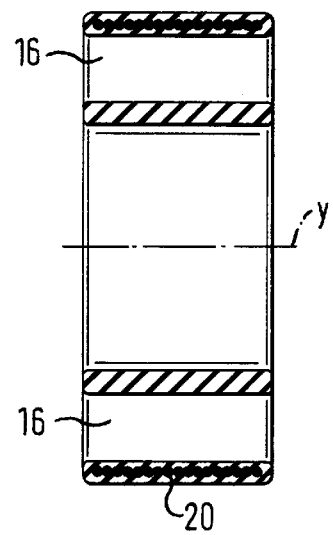
FIG. 15 is the vertical section XV—XV of FIG. 13.
Figure 14:
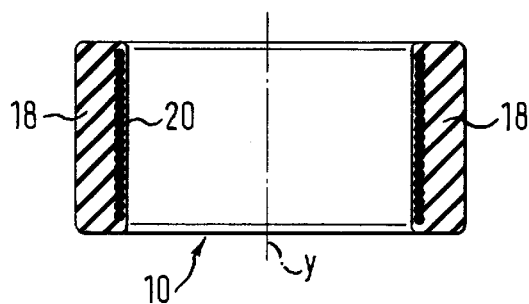
FIG. 14 is the horizontal section XIV—XIV of FIG. 13.
Figure 14A:
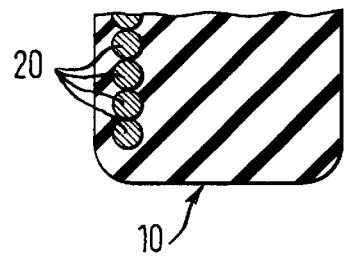
FIG. 14A is a greatly enlarged cutout of FIG. 14.

The elastomer body 10 may have an outline which differs from the diamond shape illustrated in FIGS. 1 to 12. For instance, the elastomer body 10 may be circular or elliptical. In the embodiment shown in FIGS. 13 to 15A, the outer wall 12 of the elastomer body 10 is shaped like an upright ellipse, as seen from the side according to FIG. 13, while the inner wall 14 has the shape of a lying ellipse. The principal axes of these two ellipses intersect each other at right angles. The course of the insert 20 corresponds to that of the embodiments already described, in other words it lies at the outer wall 12 or slightly spaced from the same in the area of the suspension poles 16, while it lies at the inner wall 14 or slightly spaced from the same in the two equatorial zones 18. As in the case of the embodiments according to FIGS. 1 to 6, the suspension lug shown in FIGS. 13 to 15A defines four transverse beams 22 and, at each of them, the insert 20 lies in the neutral zone as regards bending loads.

What is claimed is:

1. A suspension lug for a swinging load, comprising:
    a ring-shaped elastomer body defined by an outer wall and an inner wall, and including two opposed suspension poles and two equatorial zones, wherein the suspension poles and the equatorial zones are arranged such that the suspension poles move away from each other and the equatorial zones approach each other when the suspension lug is subjected to tensile loading; and
    a flexible insert embedded in the elastomer body such that the insert transmits tensile forces from one of the suspension poles to the other of the suspension poles through the equatorial zones when the suspension lug is subjected to tensile loading,
    wherein a distance of the insert from the inner wall of the elastomer body decreases steadily from the suspension poles to the equatorial zones.

2. The suspension lug as claimed in claim 1, wherein the elastomer body includes two pairs of oppositely oriented transverse beams for each of the suspension poles, and wherein the transverse beams extend outward from the suspension poles and narrower as a distance from the suspension poles increases.

3. The suspension lug as claimed in claim 2, wherein the transverse beams are interconnected only by the insert in the equatorial zones.

4. The suspension lug as claimed in claim 3, wherein a buffer is disposed between each pair of transverse beams, and wherein the buffer between each pair of transverse beams limits mutual approaching of the suspension poles.

5. The suspension lug as claimed in claim 3, wherein the insert is located to lie in a neutral axis of each of the transverse beams when the suspension lug is subjected to tensile loading.

6. The suspension lug as claimed in claim 2, wherein a buffer is disposed between each pair of transverse beams, and wherein the buffer between each pair of transverse beams limits mutual approaching of the suspension poles.

7. The suspension lug as claimed in claim 6, wherein the insert is located to lie in a neutral axis of each of the transverse beams when the suspension lug is subjected to tensile loading.

8. The suspension lug as claimed in claim 2, wherein the insert is located to lie in a neutral axis of each of the transverse beams when the suspension lug is subjected to tensile loading.

9. The suspension lug as claimed in claim 1, wherein the insert borders directly on the inner wall of the elastomer body in the equatorial zones.

10. The suspension lug as claimed in claim 9, wherein the distance of the insert from the outer wall of the elastomer body increases from the suspension poles at least up to the equatorial zones.

11. The suspension lug as claimed in claim 9, wherein the elastomer body includes two pairs of oppositely oriented transverse beams for each of the suspension poles, and wherein the transverse beams extend outward from the suspension poles and narrower as a distance from the suspension poles increases.

12. The suspension lug as claimed in claim 9, wherein the elastomer body comprises two opposed triangular pressure pads, with each of the pressure pads having a suspension pole as an apex, and wherein each of the pressure pads is embraced by the insert and separated from each other by an equatorial slot.

13. The suspension lug as claimed in claim 9, wherein the insert comprises at least one thread extending diagonally from one of the suspension poles to the other of the suspension poles.

14. The suspension lug as claimed in claim 1, wherein the distance of the insert from the outer wall of the elastomer body increases from the suspension poles at least up to the equatorial zones.

15. The suspension lug as claimed in claim 14, wherein the elastomer body includes two pairs of oppositely oriented transverse beams for each of the suspension poles, and wherein the transverse beams extend outward from the suspension poles and narrower as a distance from the suspension poles increases.

16. The suspension lug as claimed in claim 14, wherein the elastomer body comprises two opposed triangular pressure pads, with each of the pressure pads having a suspension pole as an apex, and wherein each of the pressure pads is embraced by the insert and separated from each other by an equatorial slot.

17. The suspension lug as claimed in claim 14, wherein the insert comprises at least one thread extending diagonally from one of the suspension poles to the other of the suspension poles.

18. The suspension lug as claimed in claim 1, wherein the elastomer body comprises two opposed triangular pressure pads, with each of the pressure pads having a suspension pole as an apex, and wherein each of the pressure pads is embraced by the insert and separated from each other by an equatorial slot.

19. The suspension lug as claimed in claim 18, wherein the elastomer body comprises two halves which each include one of the pressure pads and are interconnected only by the insert.

20. The suspension lug as claimed in claim 1, wherein the insert comprises at least one thread extending diagonally from one of the suspension poles to the other of the suspension poles.

* * * * *

UNITED STATES PATENT AND TRADEMARK OFFICE
CERTIFICATE OF CORRECTION

PATENT NO. : 6,264,164 B1
DATED : July 24, 2001
INVENTOR(S) : Klaus Steinmaier

It is certified that error appears in the above-identified patent and that said Letters Patent is hereby corrected as shown below:

Column 1,
Line 50, "is discloses" should read -- is disclosed --.

Signed and Sealed this

Twenty-ninth Day of January, 2002

Attest:

Attesting Officer

JAMES E. ROGAN
Director of the United States Patent and Trademark Office